United States Patent
Craven et al.

[15] 3,685,931
[45] Aug. 22, 1972

[54] APPARATUS FOR PRODUCING A CORRUGATED MEMBER

[72] Inventors: Harry J. Craven; William F. Hannahan; James J. Viscusi, all of Albuquerque, N. Mex.

[73] Assignee: General Electric Company

[22] Filed: Nov. 29, 1971

[21] Appl. No.: 202,798

[52] U.S. Cl. ............... 425/89, 264/286, 425/109, 425/396, 425/363, 425/163, 425/308, 425/404
[51] Int. Cl. ............................................ B29c 17/04
[58] Field of Search. 18/19 A, 19 BM, 35, 2 HA, 4 B, 18/5 A, 4 P; 264/286, 287; 156/462

[56] References Cited

UNITED STATES PATENTS

| | | |
|---|---|---|
| 690,713 | 1/1902 | Ferres .................. 18/19 A UX |
| 2,764,193 | 9/1956 | Knowles .............. 18/19 A UX |
| 3,343,220 | 9/1967 | Martinek .............. 264/286 X |
| 3,350,747 | 11/1967 | Campbell ............. 18/19 A UX |

*Primary Examiner*—Robert L. Spicer, Jr.
*Attorney*—Derek P. Lawrence et al.

[57] ABSTRACT

Apparatus for producing a corrugated member from sheet, for example, plastic preimpregnated fabric, molds each corrugation individually with a plurality of bars one of which clamps an existing corrugation in place and one or more others form new adjacent corrugations. An indexing means then advances the mold and sheet along with the bars so that subsequent relief of the bars from the mold and their retraction to their original location, positions the bars for producing consecutive corrugations in the mold.

7 Claims, 7 Drawing Figures

PATENTED AUG 22 1972

INVENTORS
HARRY J. CRAVEN
WILLIAM F. HANNAHAN
JAMES J. VISCUSI

BY Lee J. Sachs
ATTORNEY

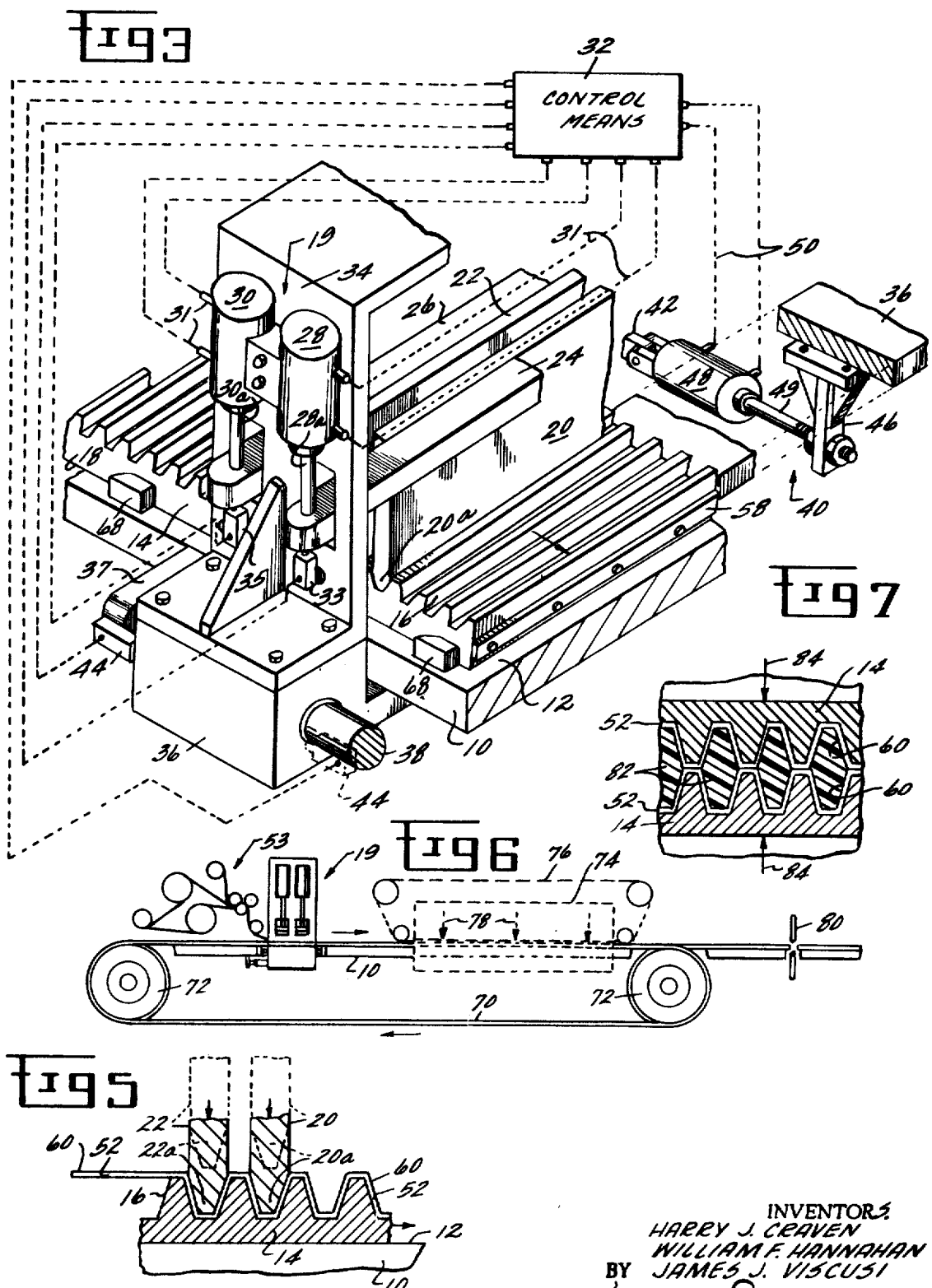

APPARATUS FOR PRODUCING A CORRUGATED MEMBER

BACKGROUND OF THE INVENTION

Manufacture of corrugated members from fabric sheet which has been preimpregnated with a partially cured resin requires the curing of the plastic while the sheet is held in shaped position on the die surface of the mold. Because the preimpregnated sheet would lose much of its shape if it is removed from the corrugated surface of a mold prior to such curing, the variety of known apparatus for continuously feeding, or intermittently though rapidly feeding, sheet between and through corrugating dies cannot be used successfully.

Also, because of the tackiness or variation in tackiness of certain preimpregnated cloth sheets from which corrugated members can be made, such cloth is inhibited from being pulled over such corners as exist on cogged wheels. When pulled over several corners, cloth becomes limited in ability to fully fill the corners.

SUMMARY OF THE INVENTION

It is a principal object of the present invention to provide improved apparatus for producing a corrugated member from sheet, particularly plastic preimpregnated fabric sheet, the apparatus positioning the sheet on a die surface of the mold on which it is held during curing.

Another object is to provide such an apparatus which will place the sheet in consecutive corrugations in the die surface of the mold, while feeding both the mold and the sheet in the direction of corrugations previously formed.

Still another object is to provide such an apparatus which includes, in addition, a means to feed, continuously, one or a plurality of sheets toward the corrugations in the mold die surface as the corrugations in the sheet are formed.

A further object is to provide such an apparatus for use in a continuous process for producing a completed corrugated member.

These and other objects and advantages will be more clearly understood from the following detailed description, examples and the drawing.

Briefly, in one form using a pair of bars, the present invention provides apparatus for producing a corrugated member from sheet, the apparatus molding each corrugation individually with a pair of bars. The sheet is first introduced over the mold. Then a first of the bars, a clamp bar, is moved toward and into engagement with the mold sandwiching the sheet therebetween to form the first corrugation or to hold or clamp an existing corrugation. Then the other bar, a lay-up bar, is so moved to form a new adjacent corrugation. Additional, consecutively operating lay-up bars can be used in other embodiments. Thereafter, an indexing means first advances the bars, for example horizontally, carrying along with them the mold and sheet. After subsequent removing of the bars from engagement with the mold and sheet, the indexing means retracts the bars to their original location, positioning the bars for cooperation with consecutive corrugations in the mold which remains advanced along with the sheet.

If a more continuous process is desired, the apparatus of the present invention provides one or more rolls of sheet, for example, of plastic preimpregnated fabric, for introduction between the bars and the mold. In another form, for continuous operation, the present invention contemplates the inclusion of a mold having a continuous die belt or a detachable die surface. Such die carries the fabric positioned in corrugations through a heated zone for curing. Thereafter, the cured corrugated member is stripped from the die which returns to its original position.

BRIEF DESCRIPTION OF THE DRAWING

FIG. 3 is an isometric, fragmentary sectional view of the indexing means and the sheet forming means in engagement with the mold;

FIG. 5 is a sectional fragmentary partially diagrammatic view of clamp and lay-up bars in engagement with a mold in the formation of the corrugated member of the present invention;

FIG. 6 is a diagrammatic view of one embodiment of the present invention for continuous operation; and FIG. 7 is a fragmentary sectional view of a batch type curing arrangement for production of the corrugated member.

DESCRIPTION OF THE PREFERRED EMBODIMENTS

Figure 1:
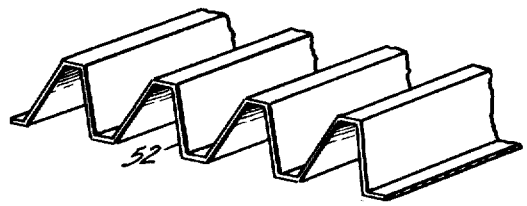
FIG. 1 is an isometric sectional view of a corrugated member produced by the present invention.

The present invention is particularly concerned with operations to be carried out upon a plurality of flexible fabric sheets preimpregnated with a partially cured plastic to form a laminated corrugated member. One form of such member is shown in FIG. 1 as a portion of the core of a panel to be used for sound suppression purposes. However, it should be understood that representation of the present invention by these examples and apparatus embodiments are not intended to be limitations on the scope of the present invention.

Figure 2:
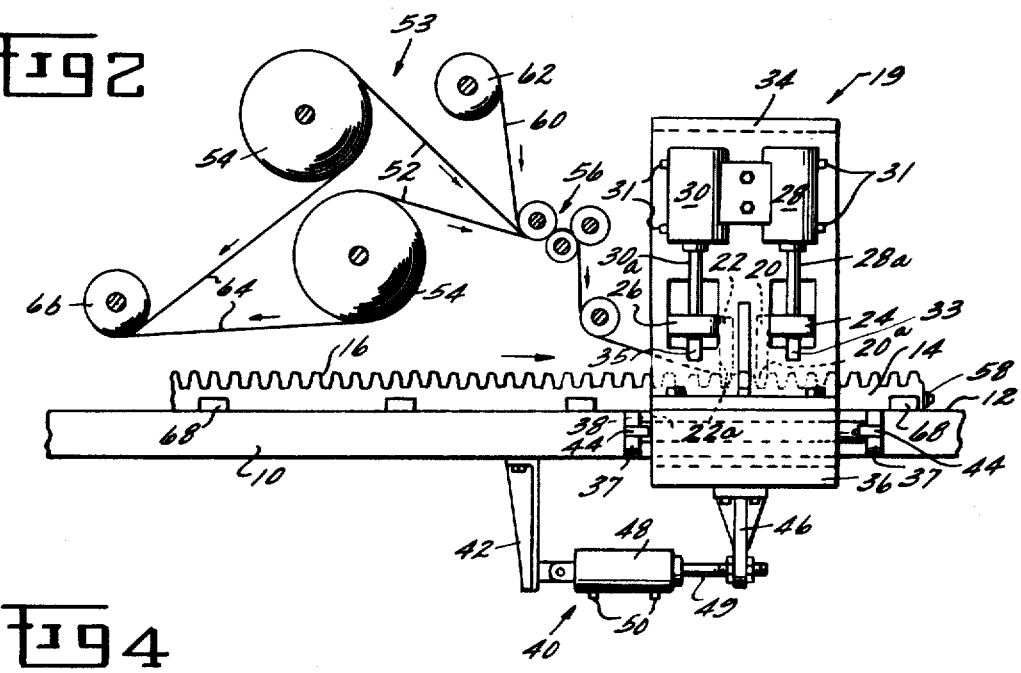
FIG. 2 is a fragmentary partially diagrammatic side view of the sheet forming means, indexing means and sheet supply means of one embodiment of the present invention.
Figure 4:
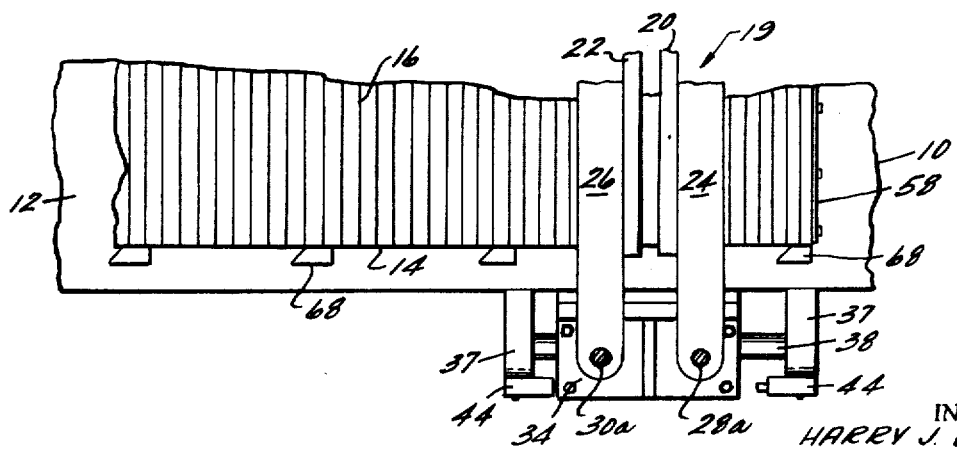
FIG. 4 is a fragmentary sectional plan view of a portion of the sheet forming means.

Referring particularly to FIGS. 2, 3 and 4, one embodiment of the apparatus of the present invention includes a support 10 having a support table surface 12. A mold 14 has a corrugated die surface 16 and a mold back surface 18 which is shaped to cooperate with and is movably, in this case slidably, mounted on table surface 12. If desired, a plurality of rollers and controlled friction pads (not shown) can be mounted on table surface 12 for each of movement of mold 14 along surface 12.

The sheet forming means of the apparatus of the present invention, shown generally at 19, includes a clamp bar 20 and a lay-up bar 22. Each of such bars has a nose portion 20a and 22a, respectively, each shaped to match the corrugations in the corrugated die surface 16 and aligned along adjacent corrugations. As is shown in the drawings, the bars 20 and 22 are carried by clamp bar and lay-up bar support members 24 and 26, respectively.

The sheet forming means of the present invention includes independently acting clamp bar and lay-up bar actuating and pressing means 28 and 30, respectively, for example, hydraulic reciprocating cylinders. Fluid for such cylinders are supplied from a source (not shown) through hydraulic fluid conduits 31. Cooperating with such cylinders are piston rods 28a and 30a, respectively, connected with the support members 24 and 26 to move bars 20 and 22 toward and away from mold 14 independently one from the other. Limit switches 33 and 35, which can be mechanical, pneumatic, fluidic, electrical, electronic, magnetic, etc., signal a control means 32 to control such movement. Such reciprocal action is shown in more detail in FIG. 5. It will be understood that bar support members 24 and 26 are supported on both ends for the described movement and application of pressure. However, for simplicity of presentation, only a portion of such described apparatus is shown. Nevertheless, actuation and movement of the entire sheet forming means 19 are controlled and coordinated by control means 32.

The actuating and pressing means 28 and 30 are mounted on gantry 34 which is carried by base 36. Such base 36 is movably carried on slide bar 38 which is secured to support 10 through brackets 37. When the actuating and pressing means 28 and 30 have retracted the piston rods, thereby withdrawing nose portions 20a and 22a from engagement with corrugated die surface 16, and limit switches 33 and 35 have so signaled control means 32, the sheet forming means 19 can be moved in either direction along slide bar 38.

According to the present invention, such movement along slide bar 38 is brought about by an indexing means shown generally at 40 and conveniently mounted on support 10, such as by indexing means bracket 42 in FIG. 2. The position of sheet forming means 19 in respect to mold 14 is signaled to control means 32 from limit switches 44, only one of which is shown in FIG. 3. In the embodiment shown, particularly in FIGS. 2 and 3, the indexing means 40 is operatively and adjustably connected to the sheet forming means 19 through bracket 46, which is attached to base 36. Bracket 46 is moved by rod 49 of indexing piston 48 pivotally mounted on indexing means bracket 42. The operation of indexing piston 48, shown to be hydraulic, but which can be any means for providing the desired motions, includes hydraulic fluid conduits 50 from a source of hydraulic fluid (now shown). Piston 48 is controlled by control means 32 which coordinates movement of piston 48 with operation of the sheet forming means 19 as will be described later. Although this embodiment employs an adjustable indexing piston to move the apparatus as described, it will be understood that a variety of means can be employed for that purpose. For example, if a mechanical means of power is required, a rack and pinion arrangement can be used.

The apparatus of the present invention can be used to produce a corrugated member from a single or a plurality of flexible sheets introduced individually in a batch type arrangement or from one or more rolls of sheet. Although the embodiments in FIGS. 2 and 6 show a more continuous type of operation, it should be understood that the present invention is not so limited. As shown particularly in FIG. 2, a sheet supply means 53 is included. A plurality of sheets 52, such as glass cloth impregnated with a partially cured plastic, for example an epoxy resin, are fed from sheet rolls 54 through tension rolls 56 beneath the nose portions 20a and 22a of the sheet forming means 19. As will be described later, at the beginning of operation such sheets are fastened to the front of the mold such as through sheet fastening bar 58.

In order to provide ease of separation between the nose portions 20a and 20b and the sheet after forming and for subsequent separation during processing, as will be described, a release film 60 such as of polytetrafluoroethylene material, one form of which is commercially available as Teflon material, is fed from release film roll 62 for superimposition on sheet 52.

Because preimpregnated cloth material as commercially available includes a separator film, such a film 64 is removed from sheet 52 as it comes from rolls 54 and is accumulated on roll 66.

Prior to operation of the apparatus of the present invention in the manufacture of a corrugated member, corrugated die surface 16 of mold 14 is conveniently coated with a standard, commercially available mold release agent of a type commonly used in the art. Prior to start of operation, the sheet or plurality of sheets 52 are fastened to sheet fastening bar 58. Control means 32 first activates clamp bar actuating and pressing means 28 to move piston rod 28a, clamp bar support member 24 and clamp bar 20 toward and into engagement with corrugated die surface 16, pressing therebetween sheet 52 and release film 60, if one is used. Limit switch 33 signals control 32 that such position has been reached. With nose portion 20a held in this position by control means 32, such control means then activates lay-up bar actuating and pressing means 30 to bring about, in the same way just described, engagement between nose portion 22a of the lay-up bar 22 with corrugated die surface 16, pressing therebetween sheet 52 and a release film which may have been used. Limit switch 35 signals control means 32 that such position has been reached. Additional lay-up bars, in other embodiments, can operate in the same way in consecutive sequence. Thus, there are produced initial consecutive, adjacent corrugations in sheet 52.

With nose portions 20a and 22a held in engagement toward die surface 16, as shown in section in FIG. 5, control means 32 then activates indexing piston 48 to advance indexing piston rod 49 a preset distance thus moving bracket 46 forward. Because bracket 46 is secured through base 36 and gantry 34 to the sheet forming means 19, and because of the engagement of the clamp bar 20 and lay-up bar 22 with the corrugated die surface of mold 16, such action of indexing piston 48 advances mold 14 and sheet forming means 19. The mold back surface 18 is moved along support table surface 12. Such forward movement of mold 14 is conveniently guided by alignment guides 68 mounted on surface 12 of support 10.

The forward movement of mold 14 with which sheet 52 is secured draws additional sheet 52 along the corrugated die surface 16 for subsequent formation into the corrugated member. Such sheet can be supplied from rolls such as 54 which are driven by the forward movement of the apparatus just described or can be supplied from individual sheets lying loosely on or above the corrugated die surface 16.

After advancement of the mold, the sheet forming means and the sheet, control means 32 then operates all clamp and lay-up bar actuating and pressing means to raise piston rods 28a and 30a sufficiently to relieve nose portions 20a and 22a from engagement with and clear of corrugated die surface 16. Such retracted position, shown in phantom in FIG. 5, is sensed for control means 32 by limit switches 33 and 35. Control means 32 then operates indexing piston 48 to extend indexing piston rod 49. This operation moves the entire sheet forming means, including the clamp bar and lay-up bar, a distance of one corrugation, back to its original starting position, in the embodiment using one lay-up bar. The above described sequence is then continuously repeated until the desired length of corrugated member is provided on corrugated die surface 16, with nose portion 20a holding or clamping each previously formed corrugation while nose portion 22a forms or "lays-up" the newer corrugation in the corrugated member.

An embodiment of the present invention which involves a more continuous production of a corrugated member is shown in FIG. 6. In that arrangement, the more rigid mold 14 shown in FIGS. 2 through 4, is replaced with a mold belt 70 carried by support 10 and belt rolls 72. Support 10 and belt 70 extend through a curing enclosure, such as an oven 74, of sufficient length to allow the corrugated member still carried by the belt to remain in the oven for that time required to cure resin impregnated in the sheet. For example, ordinarily the types of epoxy resins used to preimpregnate a fabric sheet require curing in the range of 300°–350° F. for about 1 hour.

The curing of plastic impregnated fabric which has been formed on a corrugated die, as described above, generally requires the application of pressure to the corrugated member to maintain its shape accurately during curing. Therefore, the apparatus of FIG. 6 includes a pressure belt 76 having a corrugated surface matched with corrugations of mold belt 70 and adapted to engage and mate with mold belt 70 and with the formed sheet carried by the mold belt at its entry into oven 74. Within oven 74, is a pressure means 78, for example a plurality of rolls, biased toward support 10. Pressure thus applied presses pressure belt 76 in intimate contact with formed sheet 52 on mold belt 70 during its curing in the oven.

After cured corrugated sheet 52 passes through oven 74 and is relieved from the pressure exerted by pressure belt 76, it is stripped from mold belt 70. It then can be passed through a sheet cutter 80 which can be adjusted to provide a finished corrugated member of desired size.

As was described above in connection with FIGS. 2, 3, 4 and 5, sheet forming means 19, mold 14 and sheets 52, as well as release film 60, if one is used, are all advanced through the action of indexing means 40. Similarly, the entire apparatus of FIG. 6 can be driven by such an indexing means which incrementally moves mold belt 70 in a clockwise direction as shown in FIG. 6.

If it is desirable to operate in a batch type process, curing of the formed, preimpregnated sheet can be accomplished by stacking pairs of molds, one upon the other, as shown in FIG. 7. Prior to such stacking, pressure mandrels 82, such as of silicone rubber, can be inserted in the lower mold. After stacking, the die pairs are placed in a heated press and pressure is exerted against the dies as shown by arrows 84 in FIG. 7. In such batch type operation, it is important to use release film 60 over sheet 52 for ease of separation of cured sheets 52 from each other at their points of juncture and from the mandrels.

What is claimed is:

1. In apparatus for producing a corrugated member from flexible sheet:

a mold having a die surface including corrugations to receive the sheet;

a sheet forming means having a. a clamp bar and at least one lay-up bar each supported in spaced relationship with the die surface, each bar having a nose portion shaped to match a corrugation in the die surface, the bars aligned along adjacent corrugations;

b. a clamp bar actuating and pressing means and at least one lay-up bar actuating and pressing means, each to move respectively the nose portion of the clamp bar and of the lay-up bars independently one from the other reciprocally between a spaced apart position and pressing engagement between the nose portion and the corrugation in the die surface opposite each respective nose portion sandwiching the sheet therebetween;

indexing means operatively connected with the sheet forming means to advance and retract the nose portions of the clamp bar and the lay-up bars with respect to the die surface, and thereby to advance the sheet and the mold, both carried by the nose portions of the bars when the nose portions are in engagement with the corrugations sandwiching the sheet therebetween, at least one increment each substantially equal to the distance between adjacent corrugations in the die surface and control means to coordinate operation of the clamp bar actuating and pressing means and the lay-up bar actuation means each with the other and with the indexing means.

2. The apparatus of claim 1 in which:

there is included a support having a support table surface; and the mold includes a back surface shaped to cooperate with and movably mounted on the support table surface.

3. The apparatus of claim 2 in which the control means:

a. first, operates the clamp bar actuating and pressing means and the lay-up bar actuating and pressing means, respectively in sequence, to move their respective bar nose portions into engagement with adjacent die corrugations in the die surface, sandwiching the sheet therebetween;

b. second, operates the indexing means to advance the sheet forming means at least one increment and, concurrently, to advance the mold the same distance along the support table surface as a result of engagement of the nose portions with the corrugations;

c. third, operates the clamp bar actuating and pressing means and the lay-up bar actuating and pressing means to move their respective bar nose portions in spaced apart relationship with the die surface; and d. fourth, operates the indexing means to retract the sheet forming means at least one increment in respect to the die surface.

4. The apparatus of claim 3 in which:
there is one lay-up bar;
the movement of the indexing means is one increment.

5. The apparatus of claim 1 which includes, in addition:
sheet supply means to supply at least one sheet between the die surface and nose portions of the clamp bar and lay-up bars.

6. The apparatus of claim 5 in which:
the sheet is fabric, impregnated with a partially cured plastic;
the apparatus including in addition, release film supply means to supply between the sheet and the nose portions of the press bars a release sheet which will not adhere to the nose portions.

7. The apparatus of claim 1 in which the mold is a substantially continuous mold belt having a corrugated surface; the apparatus including, in addition:
a heated curing enclosure through which the mold belt passes; and
a pressure belt extending within the curing enclosure and having a surface corrugated to match, and positioned to face, the corrugations in the mold belt; and
pressure means within the curing enclosure to press the corrugated surface of the pressure belt into engagement with the corrugated surface on the mold.

* * * * *